(12) United States Patent
Imahori (10) Patent No.: US 9,515,473 B2
(45) Date of Patent: Dec. 6, 2016

(54) ELECTRIC WIRE HOLDING DEVICE AND WIRE HARNESS

(71) Applicant: Hitachi Metals, Ltd., Tokyo (JP)

(72) Inventor: Masaaki Imahori, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/674,312

(22) Filed: Mar. 31, 2015

(65) Prior Publication Data

US 2015/0288162 A1 Oct. 8, 2015

(30) Foreign Application Priority Data

Apr. 2, 2014 (JP) .................................. 2014-076250

(51) Int. Cl.

| H01R 9/05 | (2006.01) |
| H02G 15/04 | (2006.01) |
| H02G 15/013 | (2006.01) |
| H01J 5/00 | (2006.01) |
| H01J 15/00 | (2006.01) |
| H05K 5/06 | (2006.01) |
| H01L 23/045 | (2006.01) |
| H01L 23/055 | (2006.01) |
| H01R 13/52 | (2006.01) |
| H01R 13/40 | (2006.01) |

(52) U.S. Cl.
CPC .......... *H02G 15/046* (2013.01); *H02G 15/013* (2013.01)

(58) Field of Classification Search
CPC .... H01R 9/032; H01R 13/6592; H01R 13/422; H01R 13/5808; H01R 9/0518; H02G 15/068; H02G 15/085; H02G 15/22; H02G 3/0616
USPC ...... 174/660, 73.1, 74 R, 372; 439/272, 273, 439/589
See application file for complete search history.

(56) References Cited

U.S. PATENT DOCUMENTS

| 4,671,586 | A | * | 6/1987 | DeBolt | ................... H01T 13/05 439/126 |
| 5,098,752 | A | * | 3/1992 | Chang | ................... B29C 31/002 174/84 R |
| 5,460,544 | A | * | 10/1995 | Inaba | ..................... H01R 13/53 439/578 |
| 6,595,789 | B2 | | 7/2003 | Oota et al. | |
| 6,607,399 | B2 | * | 8/2003 | Endo | ...................... H01R 4/184 439/578 |
| 6,814,617 | B2 | | 11/2004 | Oota et al. | |
| 6,969,802 | B1 | * | 11/2005 | George | ................ H02G 3/0658 174/152 G |
| 7,531,747 | B2 | * | 5/2009 | Tamm | ..................... H01R 4/20 174/84 C |
| 9,118,138 | B2 | * | 8/2015 | Bianca | ................. H01R 13/424 |
| 2002/0048994 | A1 | | 4/2002 | Oota et al. | |
| 2003/0032321 | A1 | * | 2/2003 | Wertz | ................. H01R 13/5219 439/282 |
| 2003/0207615 | A1 | | 11/2003 | Oota et al. | |
| 2009/0260232 | A1 | * | 10/2009 | Aoki | ...................... H01R 9/032 29/857 |

(Continued)

*Primary Examiner* — Chau N Nguyen
*Assistant Examiner* — Roshn Varghese
(74) *Attorney, Agent, or Firm* — Roberts Mlotkowski Safran Cole & Calderon, PC (57) ABSTRACT

An electric wire holding device is composed of an electric wire holding member made of a resin to hold an electric wire, a cylindrical member made of an electrically conductive metal, including an inner surface to be mated around and receive at least a mating portion of the electric wire holding member, and a plurality of protrusions formed around an outer circumference of the at least mating portion of the electric wire holding member for the cylindrical member to be mated therearound. The plurality of protrusions are brought into contact with the inner surface of the cylindrical member.

6 Claims, 6 Drawing Sheets

(56) References Cited

U.S. PATENT DOCUMENTS

| | | | | |
|---|---|---|---|---|
| 2011/0171856 A1* | 7/2011 | Tyler | H01R 13/648 | 439/607.52 |
| 2012/0202381 A1* | 8/2012 | Deno | H01R 13/648 | 439/607.41 |
| 2012/0285715 A1* | 11/2012 | Mayer | H01R 9/032 | 174/34 |
| 2012/0285729 A1* | 11/2012 | Imahori | H01R 9/032 | 174/152 R |
| 2014/0235085 A1* | 8/2014 | Su | H01R 13/6277 | 439/346 |

* cited by examiner

ELECTRIC WIRE HOLDING DEVICE AND WIRE HARNESS

The present application is based on Japanese patent application No. 2014-076250 filed on Apr. 2, 2014, the entire contents of which are incorporated herein by reference.

BACKGROUND OF THE INVENTION

1. Field of the Invention

This invention relates to an electric wire holding device to hold an electric wire, and a wire harness including that electric wire holding device and that electric wire.

2. Description of the Related Art

A conventional electric wire holding device is known that is equipped with a metallic shielding case (cylindrical member) and an electric wire holder (electric wire holding member) to be received in that shielding case to fix relative locations of a plurality of electric wires in that shielding case (Refer to e.g. JP Patent No. 3819229).

The electric wire holding device disclosed by JP Patent No. 3819229 is equipped with the shielding case to be attached to a unit housing having a plurality of inserting portions therethrough for a plurality of electric wire terminals respectively to be inserted therein, and the electric wire holder composed of one pair of halved holders.

The electric wire holder is made of a synthetic resin or the like, and is configured as the combined pair of halved holders with waterproof stoppers and waterproof stopper fixing clamps sandwiched therebetween which are attached to the electric wires respectively. By mating the shielding case to the electric wire holder, the electric wire holder is received in the shielding case with the waterproof stoppers held in the electric wire holder.

SUMMARY OF THE INVENTION

The electric wire holding device disclosed by JP Patent No. 3819229 has had a dimensional error of its electric wire holder or shielding case which has caused the electric wire holder to be greater in a dimension in a direction at right angles to the mating direction than the shielding case, thus making it difficult to mate the shielding case to the electric wire holder. Also, when the space between the outer surface of the electric wire holder and the inner surface of the shielding case has been large, the electric wire holder has wobbled in the shielding case.

Accordingly, it is an object of the present invention to provide an electric wire holding device and a wire harness, capable of tolerating a dimensional error to facilitate the mating of a cylindrical member to an electric wire holding member and suppress the wobbling of the electric wire holding member received in the cylindrical member.

(1) According to one embodiment of the invention, an electric wire holding device comprises:

an electric wire holding member made of a resin to hold an electric wire;

a cylindrical member made of an electrically conductive metal, including an inner surface to be mated around and receive at least a mating portion of the electric wire holding member; and a plurality of protrusions formed around an outer circumference of the at least mating portion of the electric wire holding member for the cylindrical member to be mated therearound, the plurality of protrusions to be brought into contact with the inner surface of the cylindrical member.

In one embodiment, the following modifications and changes may be made.

(i) The plurality of protrusions extend in a direction of the mating of the cylindrical member to the electric wire holding member.

(ii) The plurality of protrusions have a greater width direction dimension at their respective base ends than a width direction dimension at their respective tips to be brought into contact with the inner surface of the cylindrical member, where the width direction is at right angles to the mating direction.

(iii) The electric wire holding device further includes:

a sealing member arranged side by side with the cylindrical member in a longitudinal direction of the electric wire; and a wall formed around the sealing member side outer circumference of the electric wire holding member relative to the plurality of protrusions around the at least mating portion, the wall being lower in protrusion height than the plurality of protrusions.

(iv) The wall includes an outer circumferential surface, which is not in contact with the inner surface of the cylindrical member.

(v) The wall is formed in such a ring shape as to circle the outer circumference of the at least mating portion.

(vi) The electric wire holding device further includes a seal holding portion, the sealing member being held around an outer circumference of the seal holding portion, the seal holding portion being not greater in a dimension in a direction at right angles to the mating direction than the electric wire holding member.

(2) According to another embodiment of the invention, a wire harness comprises:

the aforesaid electric wire holding device, and the electric wire.

(Points of the Invention)

The electric wire holding device and the wire harness according to the present invention allow for tolerating a dimensional error to facilitate the mating of the cylindrical member to the electric wire holding member and suppress the wobbling of the electric wire holding member received in the cylindrical member.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Configurations of an electric wire holding device 2 and a wire harness 11 in a first embodiment of the present invention are described with reference to FIGS. 1 to 4.

This wire harness is mounted on a vehicle, and used to provide driving current for vehicle traction, for example.

Figure 1:
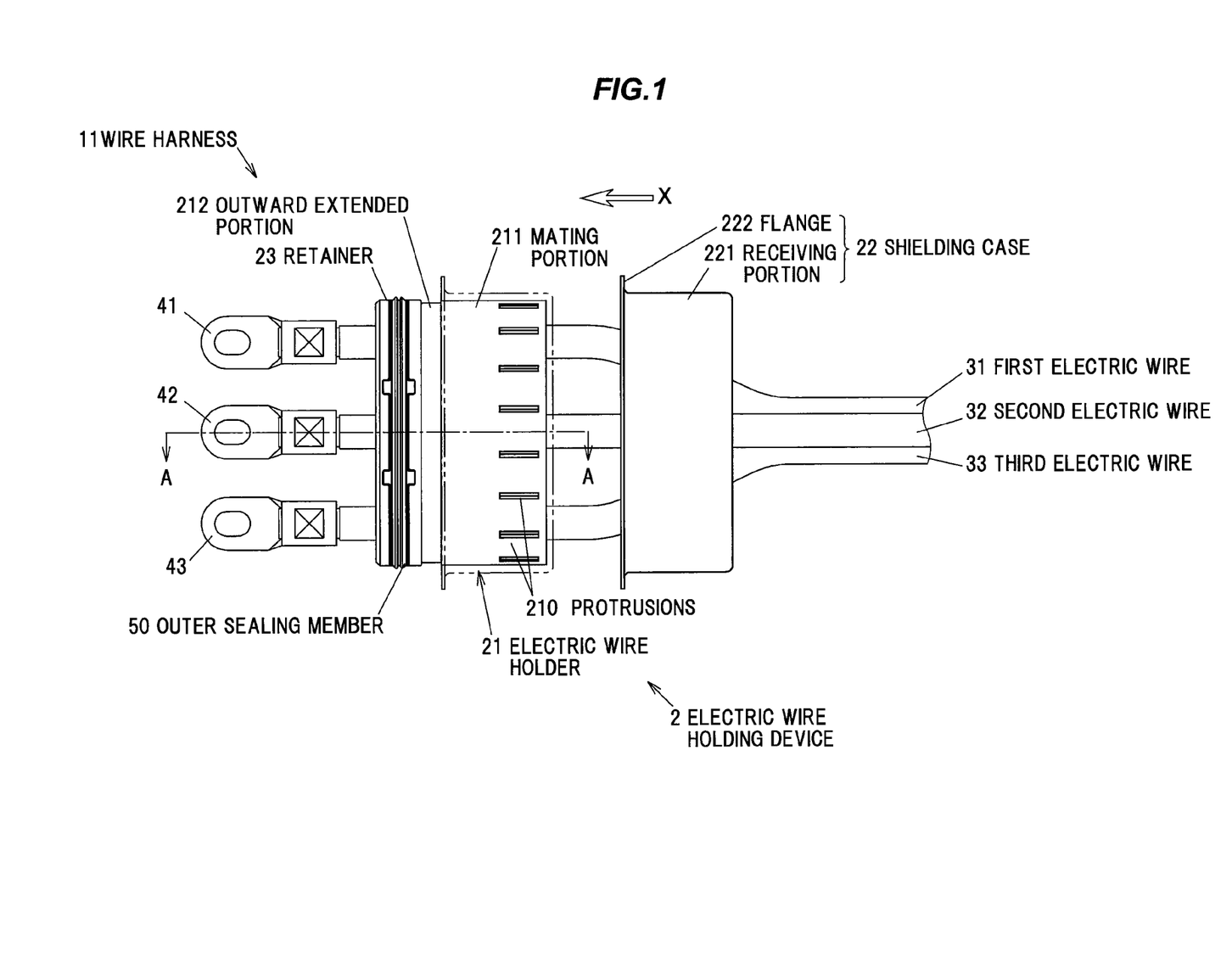
FIG. 1 is a configuration diagram showing one configuration example of an electric wire holding device and a wire harness with that electric wire holding device in a first embodiment of the present invention.

FIG. 1 is a configuration diagram showing one configuration example of the electric wire holding device 2 and the wire harness 11 with that electric wire holding device 2 in the first embodiment of the present invention. Note that, for description, FIG. 1 shows the electric wire holding device 2 with its shielding case 22 not mated to its electric wire holder 21, but with its shielding case 22 indicated by alternate long and two short dashes line mated to its electric wire holder 21.

The wire harness 11 includes first to third electric wires 31 to 33, an electric wire holder 21 made of a resin serving as an electric wire holding member to hold the first to third electric wires 31 to 33, a shielding case 22 made of an electrically conductive metal serving as a cylindrical member to be mated around and receive at least a mating portion 211 of the electric wire holder 21, and a retainer 23 serving as a seal holding portion to hold an outer sealing member 50 around an outer circumference of that retainer 23. In this embodiment, the electric wire holder 21, the shielding case 22, and the retainer 23 constitute the electric wire holding device 2.

The electric wire holder 21 and the retainer 23 are made from, for example, an electrically insulative resin such as PVD (polyvinylidene fluoride), PA (polyamide), PPS (polyphenylene sulfide) or the like, and are molded by, for example, injection molding.

The electric wire holder 21 and the retainer 23 are arranged side by side in a longitudinal direction of the first to third electric wires 31 to 33, and the first to third electric wires 31 to 33 are drawn outward from the retainer 23 at their respective one ends, and are drawn outward from the electric wire holder 21 at their respective other ends. In this embodiment, the electric wire holder 21 and the retainer 23 are formed of separate members respectively, but the electric wire holder 21 and the retainer 23 may instead be formed integrally.

The first to third electric wires 31 to 33 are connected with terminals 41 to 43, respectively, at their respective one ends drawn outward from the retainer 23. That is, the retainer 23 is arranged between the terminals 41 to 43 and the electric wire holder 21 in the longitudinal direction of the first to third electric wires 31 to 33.

The ring-shaped outer sealing member 50 held around the outer circumference of the retainer 23 provides a seal between the wire harness 11 and a member (not shown) for the wire harness 11 to be attached thereto, to enhance waterproof properties. The retainer 23 and the outer sealing member 50 are arranged side by side with the shielding case 22 in the longitudinal direction of the first to third electric wires 31 to 33.

The electric wire holder 21 is formed with a plurality of protrusions 210 (in FIG. 1, eight protrusions 210 shown), around an outer circumference of a mating portion 211 for the shielding case 22 to be mated therearound. The plurality of protrusions 210 each extend in a direction (arrow X direction in FIG. 1) of the mating of the shielding case 22 to the electric wire holder 21, and their lengths are on the order of 1 mm to 15 mm. In this embodiment, the plurality of protrusions 210 are formed side by side in the circumferential direction of the mating portion 211 for the shielding case 22 to be mated therearound.

Also, the electric wire holder 21 includes an outward extended portion 212, which extends out from one retainer 23 side end of the mating portion 211 for the shielding case 22 to be mated therearound. The outward extended portion 212 is exposed outward from the shielding case 22.

The shielding case 22 integrally includes a receiving portion 221 made of an electrically conductive metal such as iron, brass, aluminum or the like, to receive the at least mating portion 211 of the electric wire holder 21 for the shielding case 22 to be mated therearound, and a flange 222, which is jutted outward from an outer circumferential surface of the receiving portion 221. The receiving portion 221 is formed seamlessly and integrally in its circumferential direction and covers the entire circumference of the electric wire holder 21.

Figure 2A:
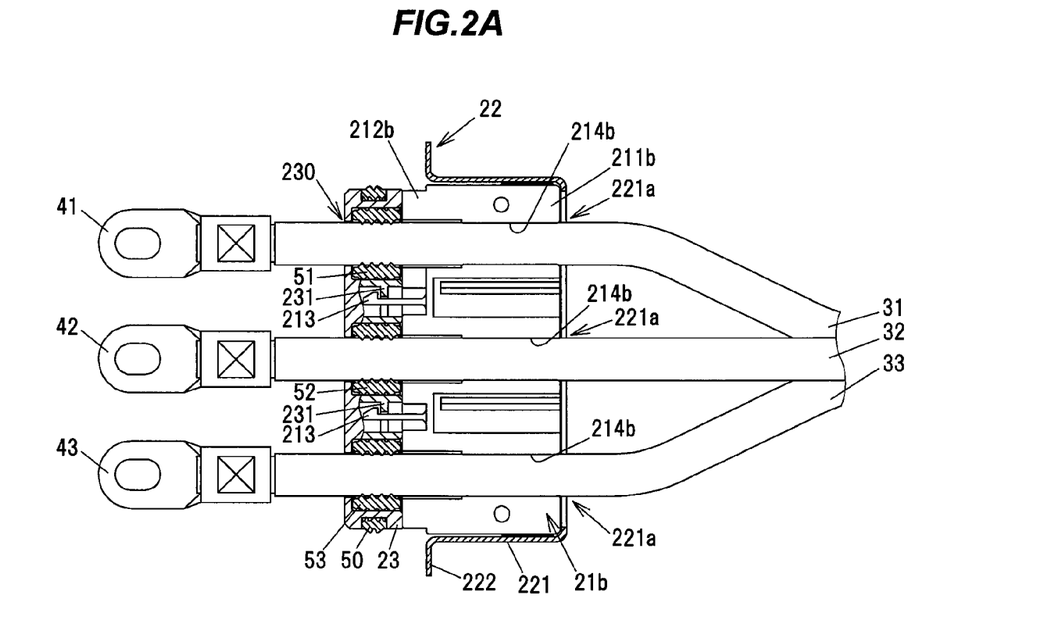
FIG. 2A is a cross sectional view showing the wire harness in a longitudinal direction of first to third electric wires.
Figure 2B:
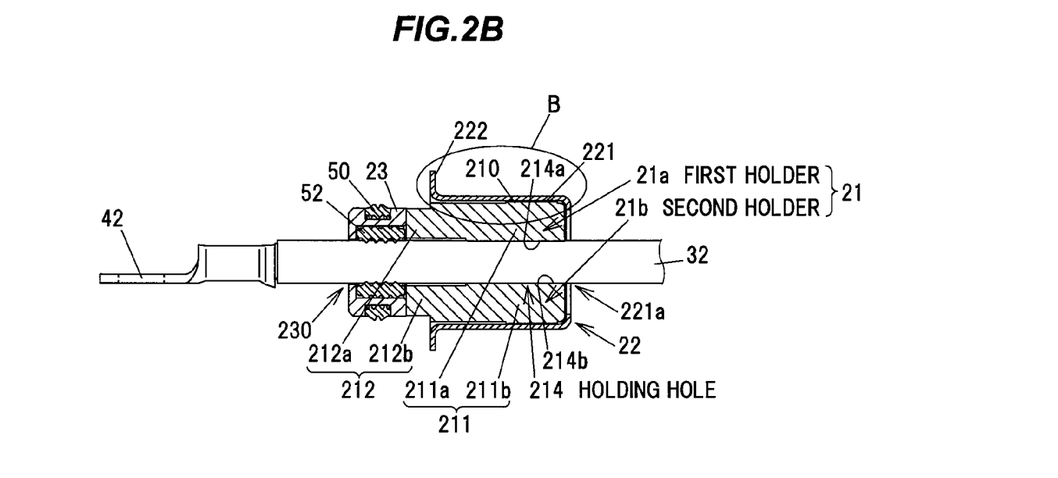
FIG. 2B is a cross sectional view along A-A line in FIG. 1 showing the wire harness.

FIG. 2A is a cross sectional view showing the wire harness 11 cut in the longitudinal direction of the first to third electric wires 31 to 33, and FIG. 2B is a cross sectional view along A-A line in FIG. 1 showing the wire harness 11.

As shown in FIG. 2B, the electric wire holder 21 is configured as combined first and second holders 21a and 21b opposite each other with the first to third electric wires 31 to 33 sandwiched therebetween. Note that, in FIG. 2A, only the second holder 21b of the first and second holders 21a and 21b is shown. In this embodiment, the first and second holders 21a and 21b are formed in the same shape.

The mating portion 211 of the electric wire holder 21 for the shielding case 22 to be mated therearound is formed by combining a first mating portion 211a of the first holder 21a and a second mating portion 211b of the second holder 21b together, while the outward extended portion 212 of the electric wire holder 21 is formed by combining a first outward extended portion 212a of the first holder 21a and a second outward extended portion 212b of the second holder 21b together.

The first mating portion 211a and the first outward extended portion 212a of the first holder 21a are formed with a plurality (in the present embodiment, three) of first circular arc grooves 214a therein, which extend in the longitudinal direction of the first to third electric wires 31 to 33. Likewise, the second mating portion 211b and the second outward extended portion 212b of the second holder 21b are formed with a plurality (in the present embodiment, three) of second circular arc grooves 214b therein, which correspond to the plurality of first circular arc grooves 214a, respectively, of the first holder 21a.

The first and second holders 21a and 21b are combined together to combine the plurality of first circular arc grooves 214a and the plurality of second circular arc grooves 214b respectively together to thereby form a plurality (in the present embodiment, three) of holding holes 214 to hold the first to third electric wires 31 to 33 respectively. Note that, in FIG. 2B, the holding hole 214, the first circular arc groove 214a and the second circular arc groove 214b, which correspond to the second electric wire 32, are shown.

The first to third electric wires 31 to 33 are inserted in the holding holes 214 respectively and held together in the electric wire holder 21 (between the first and second holders 21a and 21b). In this embodiment, the first and second circular arc grooves 214a and 214b are formed in such a manner that their inner diameters in the outward extended portion 212 side are greater than diameters of the first to third electric wires 31 to 33.

Also, the first and second holders 21a and 21b are formed with a plurality of claws 213, which protrude from the first and second mating portions 211a and 211b, in the longitudinal direction of the first to third electric wires 31 to 33, and beyond the first and second outward extended portions 212a and 212b, and which are locked in the retainer 23. Note that, in FIG. 2A, the two claws 213 in the second holder 21b side are shown.

The receiving portion 221 of the shielding case 22 is formed with a plurality (in the present embodiment, three) of lead-out openings 221a on its opposite end face to the flange 222 for the first to third electric wires 31 to 33 to be drawn outward therefrom. The lead-out openings 221a are formed in such a manner that the lead-out openings 221a, when the shielding case 22 is mated to the electric wire holder 21, are arranged at locations in correspondence with the arrangement locations of the holding holes 214, respectively, of the electric wire holder 21.

The retainer 23 is formed with a plurality (in the present embodiment, three) of inserting holes 230 therethrough for the first to third electric wires 31 to 33 respectively to be inserted therein. Between inner circumferential surfaces of the inserting holes 230 and the first to third electric wires 31 to 33, there are provided circular cylindrical inner sealing members 51 to 53, respectively. Also, between adjacent pairs of the inserting holes 230 through the retainer 23, there are formed locked portions 231, respectively, in which the claws 213 of the electric wire holder 21 are locked.

Figure 3A:
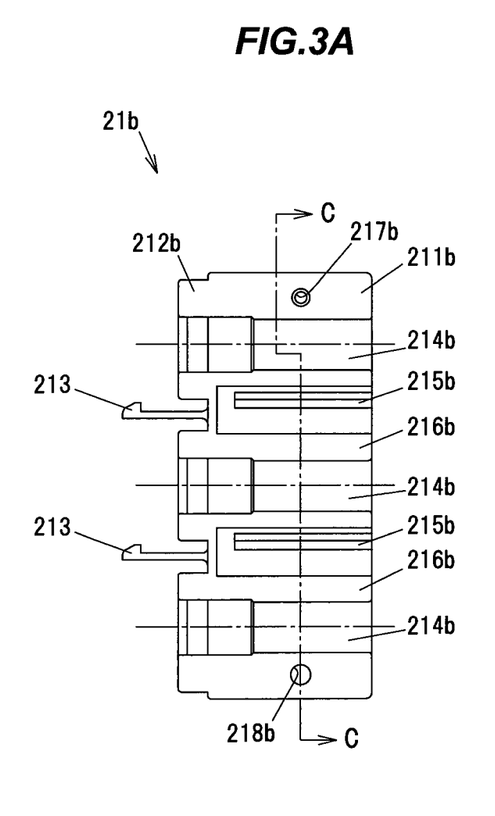
FIG. 3A is a plan view showing a second holder of an electric wire holder viewed on a side of a plurality of its circular arc grooves.
Figure 3B:
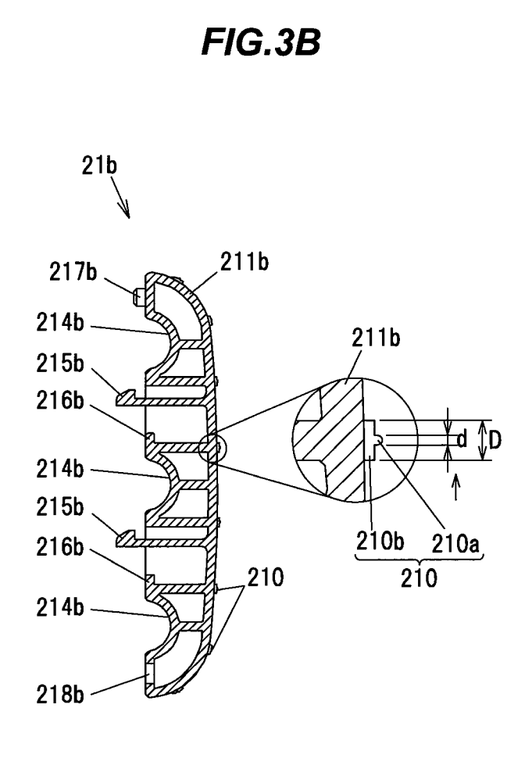
FIG. 3B is a cross sectional view along C-C line in FIG. 3A.
Figure 4:
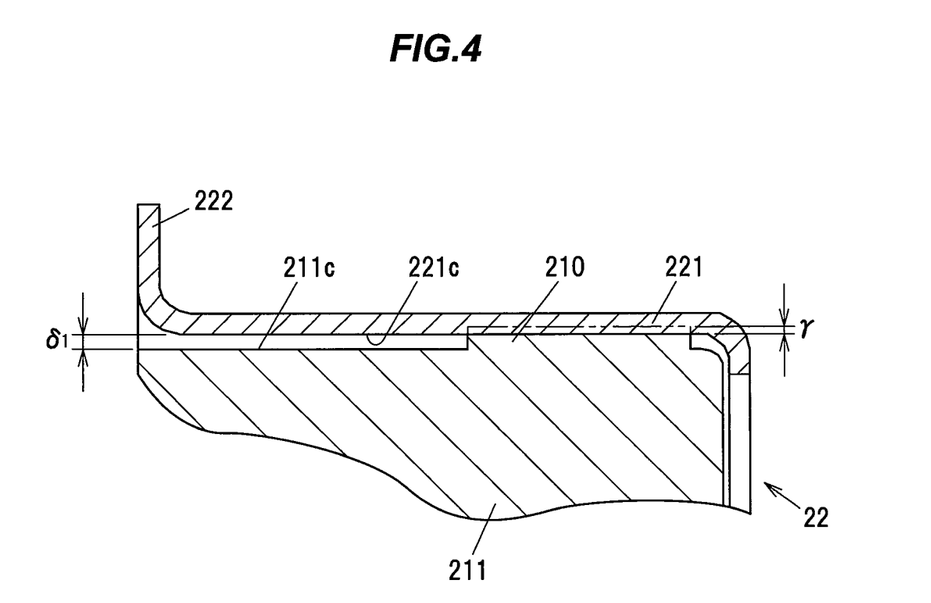
FIG. 4 is an enlarged view showing portion indicated by B in FIG. 2B.

FIG. 3A is a plan view showing the second holder 21b of the electric wire holder 21 viewed on a side of the plurality of second circular arc grooves 214b, FIG. 3B is a cross sectional view along C-C line in FIG. 3A, and FIG. 4 is an enlarged view showing portion indicated by B in FIG. 2B.

Note that in the present embodiment, because the first and second holders 21a and 21b of the electric wire holder 21 are formed in the same shapes, the second holder 21b is given as an example and described below.

As shown in FIG. 3A, the second holder 21b is formed with a plurality (in the present embodiment, two) of hooks 215b and a plurality (in the present embodiment two) of engaging portions 216b to be coupled with the first holder 21a. Also, the second mating portion 211b is formed with a mating protrusion 217b and a mating depression 218b, in such a manner that the plurality of second circular arc grooves 214b are located therebetween in a direction of alignment of those second circular arc grooves 214b. The mating protrusion 217b and the mating depression 218b are designed for relative positioning of the first and second holders 21a and 21b.

The hooks 215b are engaged to first holder 21a side engaging portions respectively, while the engaging portions 216b are engaged with first holder 21a side hooks respectively. Also, the mating protrusion 217b is mated to first holder 21a side mating depression, while the mating depression 218b is mated with first holder 21a side mating protrusion.

As shown in FIG. 3B, around an outer circumference of the second mating portion 211b, there are formed a plurality (in the present embodiment, eight) of protrusions 210. In this embodiment, the plurality of protrusions 210 are formed in such a manner as to be equally spaced in the direction of alignment of the plurality of second circular arc grooves 214b.

The mating together of the shielding case 22 and the electric wire holder 21 is performed by press fitting the shielding case 22 into the electric wire holder 21 while deforming the plurality of protrusions 210. As shown in FIG. 4, with the shielding case 22 mated to the electric wire holder 21, the protrusions 210 are brought into contact with an inner surface 221c of the receiving portion 221 of the shielding case 22. In this FIG. 4, an undeformed shape of the protrusions 210 is indicated by alternate long and two short dashes line.

In this case, the press fit allowance y of the protrusions 210 is on the order of 0.1 mm, for example. Also, a space is formed between the inner surface 221c of the shielding case 22 and the outer circumferential surface 211c of the mating portion 211 for the shielding case 22 to be mated therearound, and this space or distance indicated by $\delta_1$ between the inner surface 221c of the shielding case 22 and the outer circumferential surface 211c of the mating portion 211 for the shielding case 22 to be mated therearound is on the order of e.g. 0.5 mm.

As shown in FIG. 3B, the protrusions 210 have a greater width direction dimension D at their respective base ends 210b than a width direction dimension d at their respective tips 210a to be brought into contact with the inner surface 221c of the receiving portion 221 of the shielding case 22, where the width direction is at right angles to the direction of the mating of the shielding case 22 (in other words, the width direction is at right angles to the direction of the extending of the second circular arc grooves 214b). For this reason, the protrusions 210, when the shielding case 22 is mated to the electric wire holder 21, deform primarily at their respective tips 210a.

Note that "the width direction at right angles to the mating direction" may not be the precise direction at right angles to the mating direction, but may be e.g. a direction at an angle within ±5 degrees to the direction at right angles to the mating direction.

In this embodiment, as shown in the enlarged view in FIG. 3B, the protrusions 210 are rectangular in cross sectional shape of their respective base ends 210b, and semicircular in cross sectional shape of their respective tips 210a opposite their respective base ends 210b.

(Functions and Advantageous Effects of the First Embodiment)

The above described first embodiment has the following functions and advantageous effects.

(1) Since the electric wire holder 21 is formed with the protrusions 210 around the outer circumference of its portion 211 for the shielding case 22 to be mated therearound, when the shielding case 22 is mated to the electric wire holder 21, the protrusions 210 are brought into contact with the inner surface 221c of the shielding case 22. This makes it possible to tolerate a dimensional error of the electric wire holder 21 or the shielding case 22 to facilitate the mating of the shielding case 22 to the electric wire holder 21 and suppress the wobbling between the electric wire holder 21 and the shielding case 22. That is, even if there is a dimensional error of the electric wire holder 21 or the shielding case 22, since that dimensional error can be cancelled out by deformation of the plurality of protrusions 210, the mating of the shielding case 22 to the electric wire holder 21 allows the suppression of the wobbling of the electric wire holder 21 in the shielding case 22.

(2) Since the protrusions 210 extend in the direction of the mating of the shielding case 22 to the electric wire holder 21, the mating of the shielding case 22 to the electric wire holder 21 is facilitated in comparison with the case that the protrusions 210 extend in the circumferential direction of the electric wire holder 21, for example. Also, since the portion to be brought into contact with the inner surface 221c of the shielding case 22 is longer by the length of the protrusions 210, it is possible to further suppress the wobbling between the electric wire holder 21 and the shielding case 22.

(3) Since the protrusions 210 have a greater width direction dimension D at their respective base ends 210b than a width direction dimension d at their respective tips 210a where the width direction is at right angles to the direction of the mating of the shielding case 22 (see FIG. 3B), it is possible to, even when the tip 210a is acted on by force due to friction with the inner surface 221c of the shielding case 22, suppress a break in the protrusions 210 while ensuring an amount of deformation of the tip 210a.

(4) Since the plurality of protrusions 210 are formed side by side in the circumferential direction of the mating portion 211 for the shielding case 22 to be mated therearound, the portion to be brought into contact with the inner surface 221c of the shielding case 22 is increased, thereby making it possible to further suppress the wobbling between the electric wire holder 21 and the shielding case 22.

Second Embodiment

Next, a second embodiment of the present invention is described with reference to FIGS. 5 and 6.

Figure 5:
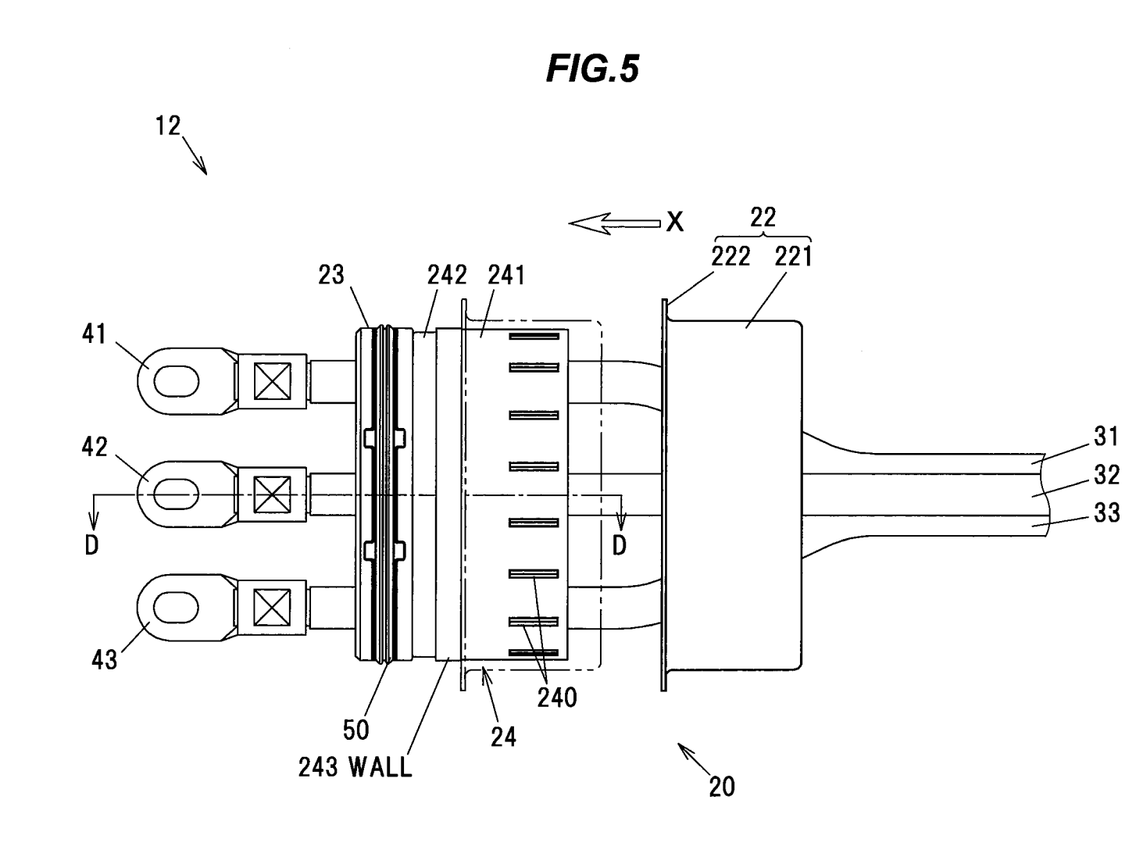
FIG. 5 is a configuration diagram showing one configuration example of an electric wire holding device and a wire harness with that electric wire holding device in a second embodiment of the present invention.

FIG. 5 is a configuration diagram showing one configuration example of an electric wire holding device 20 and a wire harness 12 with that electric wire holding device 20 in a second embodiment of the present invention. FIG. 6A is a cross sectional view along D-D line in FIG. 5 showing the wire harness 12 in the second embodiment, and FIG. 6B is an enlarged view showing portion indicated by E in FIG. 6A. Note that FIG. 5 shows the wire harness 12 with its shielding case 22 indicated by alternate long and two short dashes line mated to its electric wire holder 24. In FIG. 6B, an undeformed shape of protrusions 240 is indicated by alternate long and two short dashes line.

Figure 6A:
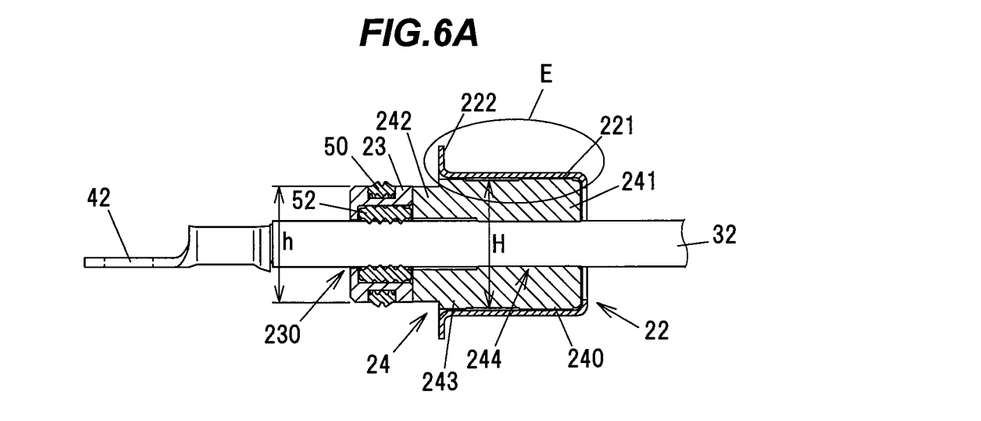
FIG. 6A is a cross sectional view along D-D line in FIG. 5 showing the wire harness in the second embodiment.
Figure 6B:
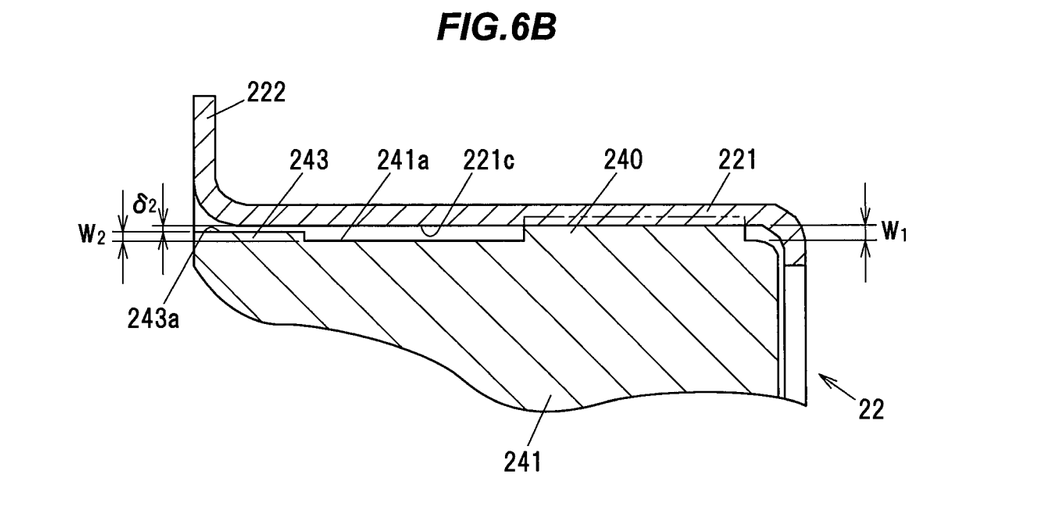
FIG. 6B is an enlarged view showing portion indicated by E in FIG. 6A.

In FIGS. 5 and 6, constituent elements having analogous functions to those described in the first embodiment are given common numerals or characters, and duplicated descriptions thereof are omitted.

In the electric wire holding device 20 and the wire harness 12 with that electric wire holding device 20 in the present embodiment, the electric wire holder 24 is different in configuration from the electric wire holder 21 in the first embodiment.

The electric wire holder 24 is formed with a wall 243 around its retainer 23 side outer circumference relative to the plurality of protrusions 240 around its portion 241 for the shielding case 22 to be mated therearound. The wall 243 is lower in protrusion height than the plurality of protrusions 240. Here, the "protrusion height" refers to a dimension in a direction in which the outer circumferential surface 241a of the mating portion 241 for the shielding case 22 to be mated therearound and the inner surface 221c of the shielding case 22 are opposite each other. As shown in FIG. 6B, the protrusion height $W_2$ of the wall 243 is lower than the protrusion height $W_1$ ($W_2 < W_1$) of the protrusions 240.

In this embodiment, the protrusion height $W_2$ of the wall 243 is set at such a dimension that the wall 243 is not in contact with the inner surface 221c of the receiving portion 221 of the shielding case 22. That is, an outer circumferential surface 243a of the wall 243 is not in contact with the inner surface 221c of the shielding case 22. The distance $\delta_2$ between the outer circumferential surface 243a of the wall 243 and the inner surface 221c of the shielding case 22 is on the order of e.g. 0.05 mm. Note that the wall 243 may instead be in contact with the inner surface 221c of the shielding case 22.

In this embodiment, the wall 243 is arranged with the outward extended portion 242 interposed between it and the retainer 23, and is formed in such a ring shape as to circle the outer circumference of the mating portion 241 for the shielding case 22 to be mated therearound.

As shown in FIG. 6A, the retainer 23 has a dimension h not greater than a dimension H of the electric wire holder 24, where the dimensions h and H are in a direction at right angles to the direction (arrow X direction in FIG. 5) of the mating of the shielding case 22.

Note that the "direction at right angles to the mating direction" may not be the precise direction at right angles to the mating direction, but may be, for example, a direction at an angle within ±5 degrees to the direction at right angles to the mating direction. The same applies to the following description.

In this embodiment, the dimension h of the retainer 23 is smaller than the dimension H (h<H) of the electric wire holder 24. More specifically, the dimension H of the electric wire holder 24 is the dimension in the direction at right angles to the mating direction between the plurality of protrusions 240 and the wall 243.

The mating together of the shielding case 22 and the electric wire holder 24 is performed in the same manner as in the first embodiment by press fitting the shielding case 22 into the electric wire holder 24 while deforming the plurality of protrusions 240. That is, the shielding case 22 is mated to the electric wire holder 24 toward the retainer 23 and the sealing member 50 (in the arrow X direction in FIG. 5).

(Functions and Advantageous Effects of the Second Embodiment)

The above described second embodiment has, besides the functions and advantageous effects (1) to (4) of the first embodiment, the following functions and advantageous effects.

(5) Since the electric wire holder 24 is formed with the wall 243 lower in protrusion height than the plurality of protrusions 240 around its retainer 23 side outer circumference relative to the plurality of protrusions 240 around its portion 241 for the shielding case 22 to be mated therearound, it is possible to avoid such a problem that when the shielding case 22 is mated to the electric wire holder 24, the protrusions 240 scrape against the inner surface 221c of the shielding case 22, causing chips to enter the retainer 23 and lower the waterproof properties of the outer sealing member 50.

(6) Since the outer circumferential surface 243a of the wall 243 is not in contact with the inner surface 221c of the shielding case 22, when the shielding case 22 is mated to the electric wire holder 24, no scraping of the wall 243 against the inner surface 221c of the shielding case 22 causing chips occurs.

(7) Since the wall 243 is formed in such a ring shape as to circle the outer circumference of the mating portion 241 of the electric wire holder 24 for the shielding case 22 to be mated therearound, it is possible to suppress the ingress of chips to the retainer 23 in the entire circumferential direction of the electric wire holder 24.

(8) Since the retainer 23 has the dimension h not greater than the dimension H of the electric wire holder 24 where the dimensions h and H are in the direction at right angles to the direction of the mating of the shielding case 22 (see FIG. 6A), it is possible to reduce the sizes of the electric wire holding device 20 and the wire harness 12, it is possible for the plurality of protrusions 240 to securely fix the shielding case 22 to the electric wire holder 24 and it is possible for the wall 243 to suppress the ingress of chips to the retainer 23. Also, there is no need to increase the size of a through hole of another device, etc. for the retainer 23 to be inserted therein.

SUMMARY OF THE EMBODIMENTS

Next, technical concepts that are ascertained from the embodiments described above will be described with the aid of reference characters and the like in the embodiments. It should be noted, however, that each of the reference characters in the following description should not be construed as limiting the constituent elements in the appended claims to the members and the like specifically shown in the embodiments.

[1] An electric wire holding device (2/20), comprising:
an electric wire holding member (electric wire holder 21/24) made of a resin to hold an electric wire (first to third electric wires 31 to 33);
a cylindrical member (shielding case 22) made of an electrically conductive metal, including an inner surface (221c) to be mated around and receive at least a mating portion (211/241) of the electric wire holder (21/24); and
a plurality of protrusions (210/240) formed around an outer circumference of the at least mating portion (211/241) of the electric wire holder (21/24) for the shielding case (22) to be mated therearound, the plurality of protrusions (210/240) to be brought into contact with the inner surface (221c) of the shielding case (22).

[2] The electric wire holding device (2/20) according to [1] above, wherein the plurality of protrusions (210/240) extend in a direction of the mating of the shielding case (22) to the electric wire holder (21/24).

[3] The electric wire holding device (2/20) according to [2] above, wherein the plurality of protrusions (210) have a greater width direction dimension at their respective base ends (210b) than a width direction dimension at their respective tips (210a) to be brought into contact with the inner surface (221c) of the shielding case (22), where the width direction is at right angles to the mating direction.

[4] The electric wire holding device (20) according to any one of [1] to [3] above, further including:
a sealing member (outer sealing member 50) arranged outside the shielding case (22); and
a wall (243) formed around the outer sealing member (50) side outer circumference of the electric wire holder (24) relative to the plurality of protrusions (240) around the at least mating portion (241), the wall (243) being lower in protrusion height than the plurality of protrusions (240).

[5] The electric wire holding device (20) according to [4] above, wherein the wall (243) includes an outer circumferential surface (243a), which is not in contact with the inner surface (221c) of the shielding case (22).

[6] The electric wire holding device (20) according to [4] or [5] above, wherein the wall (243) is formed in such a ring shape as to circle the outer circumference of the at least mating portion (241).

[7] The electric wire holding device (20) according to any one of [4] to [6] above, further including a seal holding portion (retainer 23), the outer sealing member (50) being held around an outer circumference of the retainer (23), the retainer (23) being not greater in a dimension in a direction at right angles to the mating direction than the electric wire holder (24).

[8] A wire harness, comprising:
the electric wire holding device (2/20) according to any one of [1] to [7] above, and
the first to third electric wires (31 to 33).

Although the embodiments of the present invention have been described above, the embodiments described above should not be construed as limiting the inventions according to the appended claims. It should also be noted that not all the combinations of the features described in the above embodiments are essential to the means for solving the problems of the invention.

The present invention may be appropriately modified and practiced without departing from the spirit and scope thereof. For example, although in the above embodiments it has been described that the wire harnesses 11 and 12 are mounted on a vehicle, the wire harnesses 11 and 12 may instead be applied to, for example, a communication device, an information processor and the like.

Also, although in the above embodiments the electric wire holder 21 is configured as the combined first and second holders 21a and 21b, the electric wire holder 21 may instead be configured as one member.

Also, although in the above embodiments the wire harnesses 11 and 12 include their respective three electric wires (i.e., the first to third electric wires 31 to 33), the number of the electric wires is not particularly limited.

Also, although in the above embodiments the electric wire holders 21 and 24 include their respective outward extended portions 212 and 242, the electric wire holders 21 and 24 may instead have no respective outward extended portions 212 and 242, for example.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. An electric wire holding device, comprising: an electric wire holding member made of a resin to hold an electric wire; a cylindrical member made of an electrically conductive metal, including a continuous inner surface to be mated around and receive at least a mating portion of the electric wire holding member; a sealing member arranged side by side with the cylindrical member in a longitudinal direction of the electric wire; a seal holding portion, the sealing member being held around an outer circumference of the seal holding portion; a plurality of protrusions formed around an outer circumference of the at least mating portion of the electric wire holding member for the cylindrical member to be mated therearound, the plurality of protrusions to be brought into contact with the inner surface of the cylindrical member, and a wall formed around an outer circumference of the mating portion around the sealing member side outer circumference of the electric wire holding member relative to the plurality of protrusions around the at least mating portion, the wall being lower in protrusion height than the plurality of protrusions but higher in protrusion height than an outer circumferential surface of the mating portion, wherein a distance between an outer circumference of the wall and the electric wire is longer than a distance between an outer circumference of the seal holding portion and the electric wire, wherein the protrusions resiliently deform against the continuous inner surface of the cylindrical member, and wherein a protruding direction of the wall of the electric wire holding member is the same as a protruding direction of the protrusions, and the wall is formed between the sealing member and the protrusions in a ring shape so as to circumscribe an outer circumference of the at least mating portion.

2. The electric wire holding device according to claim 1, wherein the wall includes an outer circumferential surface, which is not in contact with the inner surface of the cylindrical member.

3. The electric wire holding device according to claim 1, wherein the wall is formed in such a ring shape as to circle the outer circumference of the at least mating portion.

4. The electric wire holding device according to claim 1, wherein the seal holding portion being not greater in a dimension in a direction at right angles to the mating direction than the electric wire holding member.

5. The electric wire holding device according to claim 1, wherein base ends of the protrusions have a flat upper surface that the tips extend from, and respective tips to be brought into contact with the inner surface of the cylindrical member are semicircular in cross sectional shape.

6. The electric wire holding device according to claim 5, wherein the flat upper surface of the base ends of the protrusions intersect with sides of their respective tips.

* * * * *